United States Patent
Kruglick

(10) Patent No.: US 9,954,964 B2
(45) Date of Patent: *Apr. 24, 2018

(54) CONTENT SUGGESTION FOR POSTING ON COMMUNICATION NETWORK

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,695

(22) Filed: Jan. 21, 2016

(65) Prior Publication Data

US 2016/0142500 A1 May 19, 2016

Related U.S. Application Data

(63) Continuation of application No. 13/816,102, filed as application No. PCT/US2012/047313 on Jul. 19, 2012, now Pat. No. 9,282,153.

(51) Int. Cl.
*G06F 15/16* (2006.01)
*H04L 29/08* (2006.01)
(Continued)

(52) U.S. Cl.
CPC .............. *H04L 67/22* (2013.01); *H04L 51/32* (2013.01); *H04L 67/306* (2013.01); *H04W 4/206* (2013.01)

(58) Field of Classification Search
CPC ... H04L 51/32; H04L 67/306; H04L 61/1582; H04L 67/10; H04L 67/22; G06F 17/241;
(Continued)

(56) References Cited

U.S. PATENT DOCUMENTS 6,493,703 B1   12/2002   Knight et al.
6,922,689 B2    7/2005   Shtivelman
(Continued)

OTHER PUBLICATIONS

"Keyword / Terminology Extraction," accessed at http://web.archive.org/web/20120615004420/http://www.alchemyapi.com/api/keyword, accessed on Jan. 9, 2015, p. 2.
(Continued)

*Primary Examiner* — Suraj Joshi
*Assistant Examiner* — Ayele Woldemariam
(74) *Attorney, Agent, or Firm* — Turk IP Law, LLC

(57) ABSTRACT

Technologies are presented for providing a suggestion list presenting options for posting information related to viewed content on a communication network. In some examples, a user may desire to contribute to posted content by adding comments and other relevant information. A system may identify one or more key terms included in the viewed content, and may compare the key terms with content, such as files, emails, websites, images and media content, on computing devices and web browser histories associated with the user to identify information that may be related to the viewed content. If the system identifies information related to the key terms of the viewed content, the system may present the identified information associated with key terms to the user, and may enable selection from a posting suggestion list for automatically posting.

18 Claims, 6 Drawing Sheets

(51) Int. Cl.
*H04W 4/20* (2018.01)
*H04L 12/58* (2006.01)

(58) Field of Classification Search
CPC ......... G06F 17/30646; G06F 17/30867; G06F 21/31; G06F 3/04842; H04M 1/274558
See application file for complete search history.

(56) References Cited

U.S. PATENT DOCUMENTS

| | | |
|---|---|---|
| 7,844,668 B2 | 11/2010 | Canning et al. |
| 7,984,070 B2 | 7/2011 | White |
| 8,055,673 B2 | 11/2011 | Churchill et al. |
| 8,078,602 B2 | 12/2011 | Martin |
| 8,156,128 B2 | 4/2012 | Ramer et al. |
| 2006/0086781 A1 | 4/2006 | Jung et al. |
| 2007/0204308 A1* | 8/2007 | Nicholas ............ H04N 7/17318 725/86 |
| 2009/0165054 A1* | 6/2009 | Rudolph ............ H04N 5/44543 725/46 |
| 2010/0332283 A1 | 12/2010 | Ng et al. |
| 2012/0084657 A1* | 4/2012 | Ranade ............ G06F 17/30876 715/733 |
| 2012/0102050 A1* | 4/2012 | Button ................. G06N 5/043 707/749 |
| 2012/0123992 A1* | 5/2012 | Randall ............ G06F 17/30038 706/50 |
| 2012/0124630 A1* | 5/2012 | Wellen ............... H04N 21/4334 725/109 |
| 2012/0158720 A1 | 6/2012 | Luan et al. |
| 2012/0179757 A1 | 7/2012 | Jones et al. |
| 2012/0290926 A1* | 11/2012 | Kapadia ............ G06F 17/2288 715/255 |
| 2013/0014136 A1* | 1/2013 | Bhatia ................. H04N 21/252 725/9 |

OTHER PUBLICATIONS

"Social Media Automation," accessed at http://web.archive.org/web/20120510185322/http://socialcowgirl.com/services/social-media-management/social-media-automation, accessed on Jan. 9, 2015, p. 3.

"The social network built for the enterprise," accessed at http://web.archive.org/web/20120714060026/http://www.socialcast.com/, accessed on Jan. 9, 2015, p. 4.

"Yammer is a Private Social Network for Your Company," accessed at http://web.archive.org/web/20120713201610/https://www.yammer.com/, accessed on Jan. 9, 2015, p. 2.

International Search Report and Written Opinion for International Application No. PCT/US12/47313, dated Sep. 20, 2012.

Natale, C., "7 Tools to Automate Your Media Management," accessed at http://workawesome.com/software/social-media-management/, posted on Jul. 5, 2012, p. 3.

* cited by examiner

CONTENT SUGGESTION FOR POSTING ON COMMUNICATION NETWORK

CROSS-REFERENCE TO RELATED APPLICATIONS

This Application is a continuation application under 35 U.S.C. § 120 of U.S. patent application Ser. No. 13/816,102, filed on Feb. 8, 2013, now U.S. Pat. No. 9,282,153, which is the U.S. National Stage filing under 35 U.S.C. § 371 of International Application No. PCT/US 12/47313, filed on Jul. 19, 2012. The disclosures of U.S. patent application Ser. No. 13/816,102 and the International Application No. PCT/US 12/47313 are hereby incorporated by reference in their entireties.

BACKGROUND

Unless otherwise indicated herein, the materials described in this section are not prior art to the claims in this application and are not admitted to be prior art by inclusion in this section.

In a communication environment, users may view and share information over a communication network such as social and professional networks, blogs and other media sharing networks. Users may post content such as status updates, comments, pictures, videos, articles, and other content, and subscribing users may contribute to posted content by posting additional comments, pictures, and other information related to the posted content. Typically, when a user desires to contributed to posted content, the user needs to manually generate the content for posting, and if the user wants to add a link or attachment to additional information, the user may have to manually locate the information and add the attachment to the posted content. Manually locating and generating content for posting in response to posted content on the communication network may be time consuming for the user, and may also be inconvenient if the user is unable to remember where relevant information is stored and is unable to quickly locate the material desired for posting in response to the viewed content.

SUMMARY

The present disclosure generally describes techniques for providing content suggestion for selecting content to be posted on a communication network. According to some examples, the present disclosure describes a method for suggesting content in conjunction with a posting on a communication network. The method may include detecting a posting intended for a communication network, determining one or more key terms included in the posting, identifying information within a predefined domain associated with the one or more key terms, presenting the identified information associated with the one or more key terms, and enabling a selection from the identified information to be transmitted to the communication network for posting.

According to some examples, the present disclosure also describes a server for suggesting content for posting on a communication network. The server may include a memory configured to store instructions, a communication module configured to facilitate communications with one or more communication networks and one or more computing devices, and a processor configured to execute a posting application in conjunction with the instructions stored in the memory. The posting application may be configured to detect a posting intended for a communication network, determine one or more key terms included in the posting, identify information within a predefined domain associated with the one or more key terms, present the identified information associated with the one or more key terms, and enable a selection from the identified information to be transmitted to the communication network for posting.

According to further examples, the present disclosure also describes a computer readable memory device with instructions stored thereon for suggesting content for posting on a communication network. The instructions may include detecting a posting intended for a communication network, determining one or more key terms included in the posting, identifying information within a predefined domain associated with the one or more key terms, presenting the identified information associated with the one or more key terms, and enabling a selection from the identified information to be transmitted to the communication network for posting.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
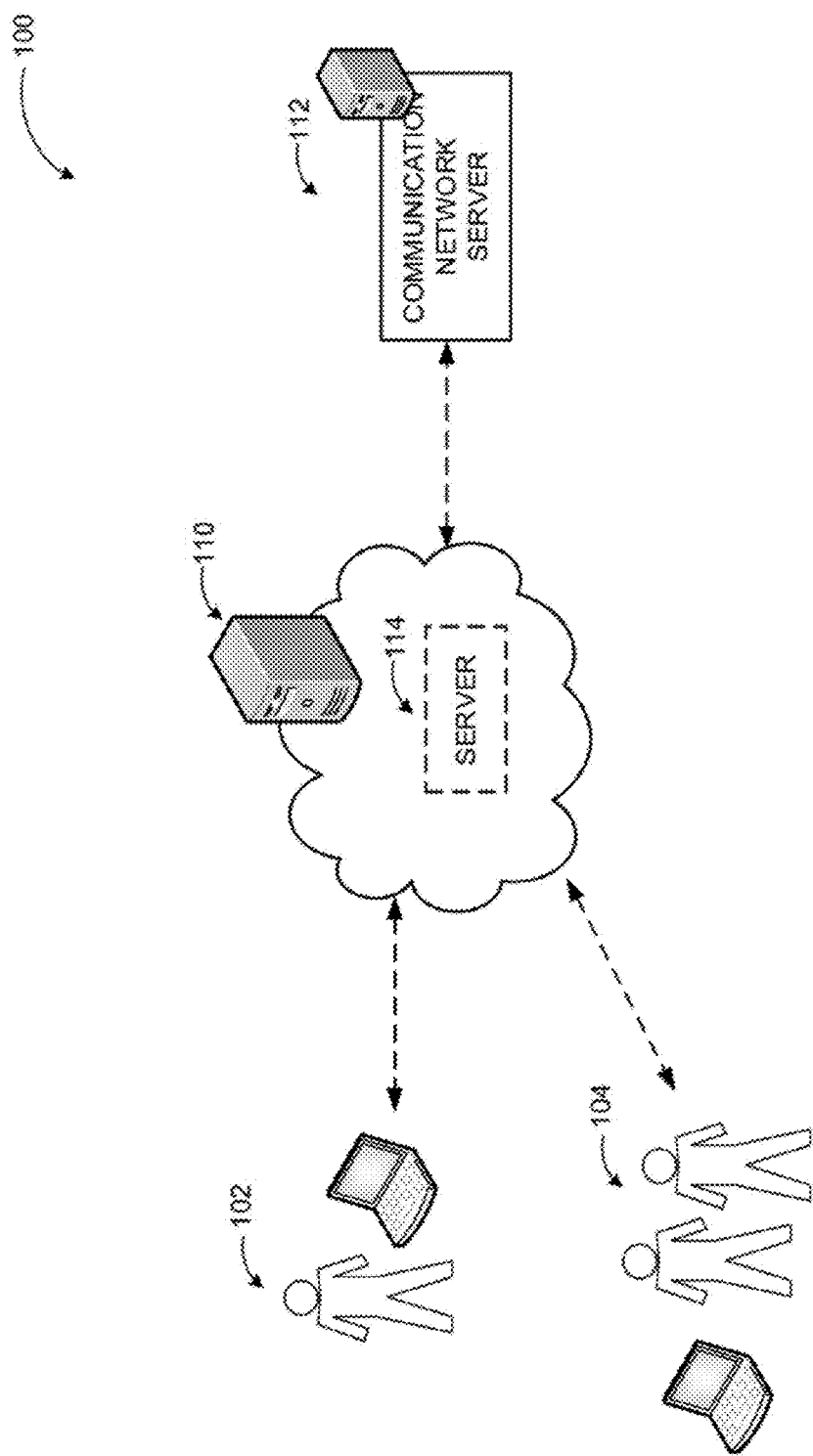
FIG. 1 illustrates an example scenario for posting content to a communication network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing suggested content to be posted along with posted content on a communication network.

Briefly stated, technologies are presented for providing a suggestion list presenting options for posting information related to viewed content on a communication network. In some examples, a user may desire to contribute to posted content by adding comments and other relevant information. A system may identify one or more key terms included in the viewed content, and may compare the key terms with content, such as files, emails, websites, images and media content, on computing devices and web browser histories associated with the user to identify information that may be related to the viewed content. If the system identifies information related to the key terms of the viewed content, the system may present the identified information associated with key terms to the user, and may enable selection from the posting suggestion list for automatically posting.

FIG. 1 illustrates an example scenario for posting content to a communication network, arranged in accordance with at least some embodiments described herein. As demonstrated in a diagram 100, a user 102 may access a communication network 112 over a cloud 110. An example communication network may include a social network, an enterprise network, a collaboration network, and/or a professional network, as well as other platforms for accessing and viewing content such as a blog network or other information exchange networks. In an example scenario, the user 102 may access and view content provided by the communication network 112 via a web browser application on one or more computing devices associated with the user 102, including for example, a personal computing device, laptop, desktop, tablet, and/or smartphone.

In an example embodiment, the user 102 may be able to view content from the communication network 112 such as media files, including audio and video files, pictures, textual content, such as blog posts, comments, status updates, and other posted textual content by users affiliated with the communication network 112. The user 102 may also be able to contribute to the viewed content from the communication network 112 by posting content such as a comment, annotation, link, file attachment, image, or other related content in response to the viewed content. In an example scenario, the user 102 may determine if and when the user 102 desires to add a comment in response to viewed content, and the user 102 may independently and manually generate the comment for posting with the viewed content on the communication network 112. Additionally, the user 102 may desire to add information to the viewed content, such as a file attachment or a link to related content. In order for the user 102 to add a file on the user's computing device as an attachment with the viewed content, the user 102 may locate the file where it is stored and manually add the file attachment to the viewed content. Similarly, if the user 102 desires to add a link to an article related to the viewed content that the user remembers reading previously on a web browser, the user 102 may search through a web browser history, or perform other searches to locate the desired article for posting. Then, the user 102 may manually copy and paste the link, or otherwise add an attachment to the article with the viewed content. Manually locating and generating content for posting in response to viewed content on the communication network may be time consuming for the user 102, and may also be inconvenient if the user 102 is unable to quickly locate the material desired for posting in response to the viewed content.

In a system according to embodiments, content for posting in response to viewed content over the communication network may be suggested to the user 102 so that the user 102 may quickly view relevant content options for posting in response to the viewed content. The user 102 may select from the options for automatically posting the selected content along with the viewed content, saving the user 102 time and effort in remembering and locating content for posting with the viewed content. Suggested relevant information options may include information identified on the user's computing device such as files, images, emails, documents, and media that may be determined to be related to the viewed content on the communication network 112. Additionally, suggested relevant content options may include links to websites, articles, videos, emails and other files identified on a web browser history that have been accessed from the user's computing device.

In an example embodiment, when the user 102 views content posted on the communication network 112, the system may detect the viewed content and may identify one or more key terms included in the viewed content. Additionally, when a subscriber of the communication network 112 initially generates content to be posted on the communication network 112, the system may detect the content to be posted and may identify one or more key terms and other properties included in the content to be posted. For example, the system may process natural language and metadata of viewed content to extract one or more key terms and other properties, such as tags, faces and objects recognized via facial and object recognition, from the viewed content on the communication network 112. The identified key terms may be saved in metadata associated with the viewed content, so that the key terms can be used again subsequently when viewed by another user on the communication network 112. After identifying one or more key terms associated with the viewed content posted on the communication network, the system may search for content related to the key terms within a predefined domain associated with the user 102 for providing options to the user 102 for posting content along with the viewed content.

In a system according to embodiments, the system may search for information related to the identified one or more key terms using search tools built into an operating system or a file system of one or more computing devices associated with the user, such as personal computing device, tablet, smartphone, cloud drives, and additionally, on backup storage devices. The system may also search web browser histories on the one or more computing devices associated with the user 102 to identify websites and other media that the user 102 has searched and viewed that may be related to the viewed content on the communication network 112. The system may additionally search for information, which may be stored on a server 114 in the cloud 110 associated with the user 102. For example, the user 102 may utilize data storage provided by the cloud 110 for storing files and other information in a centralized location. Further, the system may search for information stored in a network accessed by multiple users 104, such as an enterprise network, where the multiple users 104 may share and collaborate on files, emails, calendars, documents, and other media content. Additionally, the system may search other posted content on the communication network 112 posted by the user or by other users and previously viewed by the user that may be related to the currently viewed content.

Figure 2:
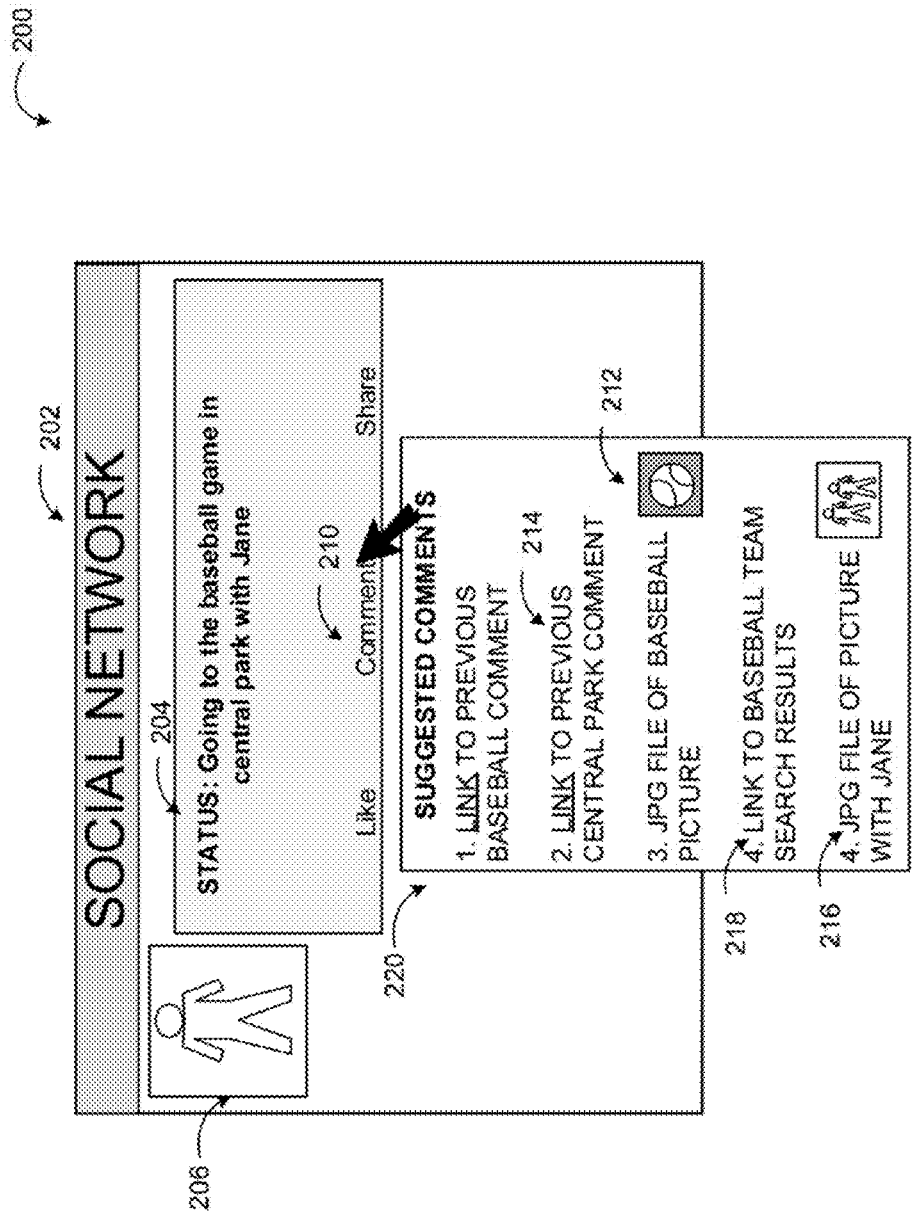
FIG. 2 illustrates an example content suggestion list associated with viewed content on a communication network.

FIG. 2 illustrates an example content suggestion list associated with viewed content on a communication network, arranged in accordance with at least some embodiments described herein. As discussed above in conjunction with FIG. 1, when a user views content 204 posted on a communication network, such as a social network 202, the system may identify one or more key terms associated with the viewed content 204, as well as other properties such as object and facial recognition, tags and metadata. Example viewed content 204 may be content posted by a user 206 subscribing to the social network 202, such as a status update, a comment, a link to external content, such as a website or article, media file attachments, and images. The system may search a predefined domain associated with the user to identify information which may be related to the identified one or more key terms of the viewed content 204. The predefined domain may include a file system on one or more computing devices and external data stores associated with the user as an individual or group member, networks associated with the user and additional users, a cloud network, a viewing history, and other posted content on the communication network.

In a system according to embodiments, as demonstrated in a diagram 200, when searching for information within the predefined network that may be related to the viewed content 204, the system may compare the identified one or more key terms included in the viewed content 204 with information identified during the search of the predefined domain associated with the user. The system may compare the key terms and other properties such as object and facial recognition, tags and metadata, identified with the viewed content 204 with textual data, metadata, tags, facial recognition, and object recognition results associated with the information identified during the search within the predefined domain. If the one or more key terms are determined to be related to one or more of the textual data, metadata, tags, and facial and object recognition results associated with the information identified during the search of the predefined domain, the system may determine that the identified information may be related to the viewed content 204.

In an example embodiment, the system may select the identified information determined to be related to the viewed content 204, and may present the selected identified information to the user. The selected identified information may be presented on a content suggestion list 220 for providing the user with a list of options of identified information related to the viewed content 204 that the user may select to post along with the viewed content 204. The identified information presented on the content suggestion list 220 may include a link 218 to a website identified in a web browser history related to the viewed content 204, for example. The identified information presented on the content suggestion list 220 may also include a link 216 to a file stored on the user's computing device or other data storage associated with the user such as an image, document, email, video or other related file. The content suggestion list 220 may include a thumbnail 212 of the identified information for providing a brief preview to the user of the identified information related to the viewed content 204. In another example, the system may determine if the identified information related to the viewed content 204 has already been posted to the communication network, and a link may be provided to the previously posted 214 identified information so that a duplicate of the identified information is not uploaded wasting time, bandwidth, and memory associated with the communication network.

In a system according to embodiments, the content suggestion list 220 may be automatically presented when the user views the content on the communication network. In an example scenario, the content suggestion list 220 may be presented upon detection of the user's intent to post a comment 210 with the viewed content. For example, upon a selection of the comment 210 option associated with the viewed content 204 (e.g., through a right click, a mouse over, and/or hover near the comment 210 option), the content suggestion list 220 may be automatically displayed. Additionally, the content suggestion list 220 may be automatically displayed upon detection of a touch, gesture or voice command by the user executed on a gesture and/or voice enabled device. The system may enable the user to select from the content suggestion list 220 presenting related identified information options, and upon detection of a selection by the user, the system may post the selected information along with the viewed content 204.

Figure 3:
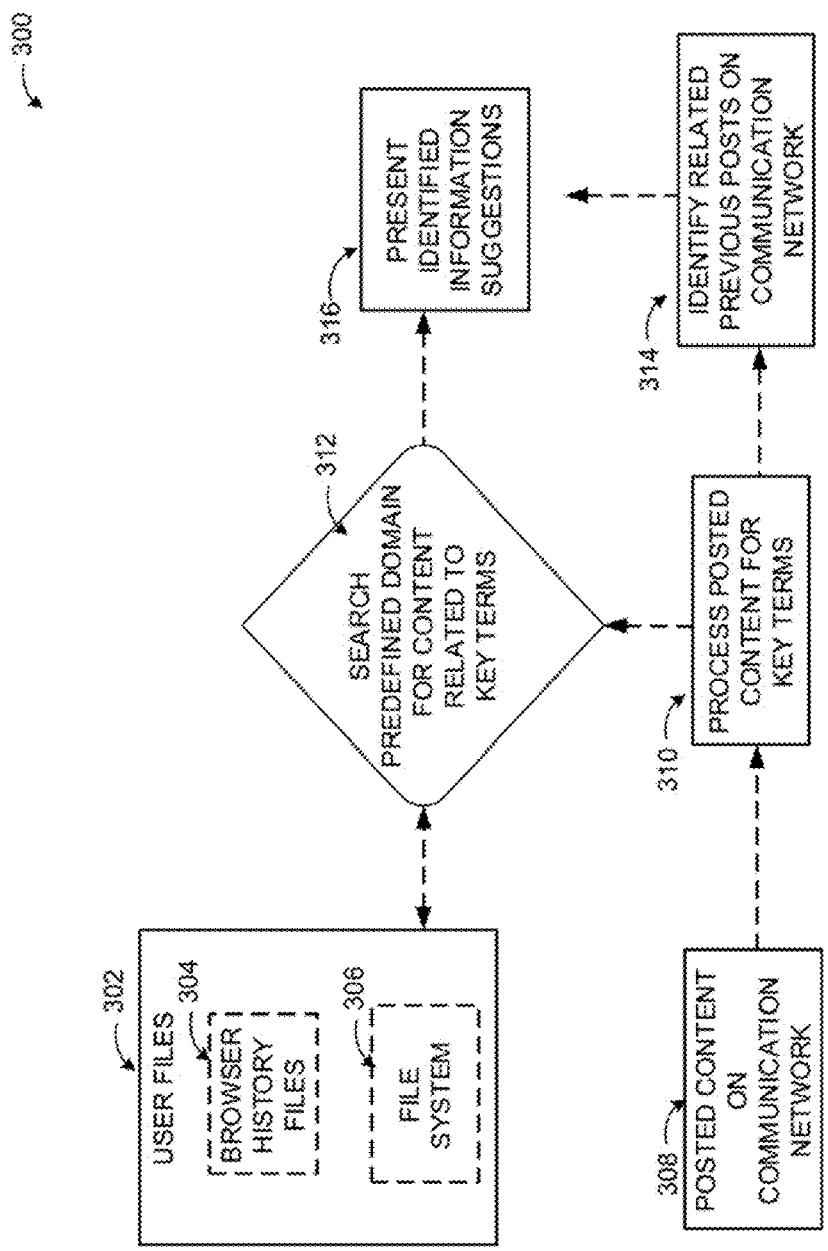
FIG. 3 illustrates an example scenario for suggesting content to be posted in conjunction with a posting on a communication network.

FIG. 3 illustrates an example scenario for suggesting content to be posted in conjunction with a posting on a communication network, arranged in accordance with at least some embodiments described herein. As demonstrated in a diagram 300, a user may view content posted a communication network 308, such as a social network, professional network, enterprise network, collaboration network, and/or blog network. When the user views the posted content, the system may process (310) natural language of the viewed content to extract one or more key terms and other properties such as tags and results of image processing such as facial recognition, and object recognition.

In a system according to embodiments, after identifying one or more key terms associated with the viewed content posted on the communication network, the system may search a predefined domain 312 associated with the user for identifying information and content related to the key terms. The predefined domain associated with the user may include user files 302 such as files located stored within a file system 306 of one or more computing devices associated with the user and web browser history files 304. The system may search for information related to the identified one or more key terms on the file systems of the one or more computing devices associated with the user, and may also search the web browser histories on the one or more computing devices associated with to the user. The system may also search external networks and data storage such as a cloud network and an enterprise or collaboration network accessed by multiple users in order to identify information that may be related to the viewed content on the communication network. The system may additionally search other previously posted content 314 on the communication network posted by the user or by other users that may be related to the currently viewed content.

In an example embodiment, if the one or more key terms included in the viewed content on the communication network are determined to be related to the information identified during the search of the predefined domain based on a comparison of one or more of the textual data, metadata, tags, facial recognition, and object recognition results associated with the viewed content, the system may determine that the identified information may be related to the viewed content. The system may select the identified information determined to be related to the viewed content, and may present the selected identified information suggestions 316 to the user. The selected identified information may be presented on a content suggestion list for providing the user with a list of options of identified information related to the viewed content that the user may select to post along with the viewed content. The selected information may be presented structured by relevance, date, source, keyword, file type, size, statistical significance, media type, or any combination of these or similar factors.

Figure 4:
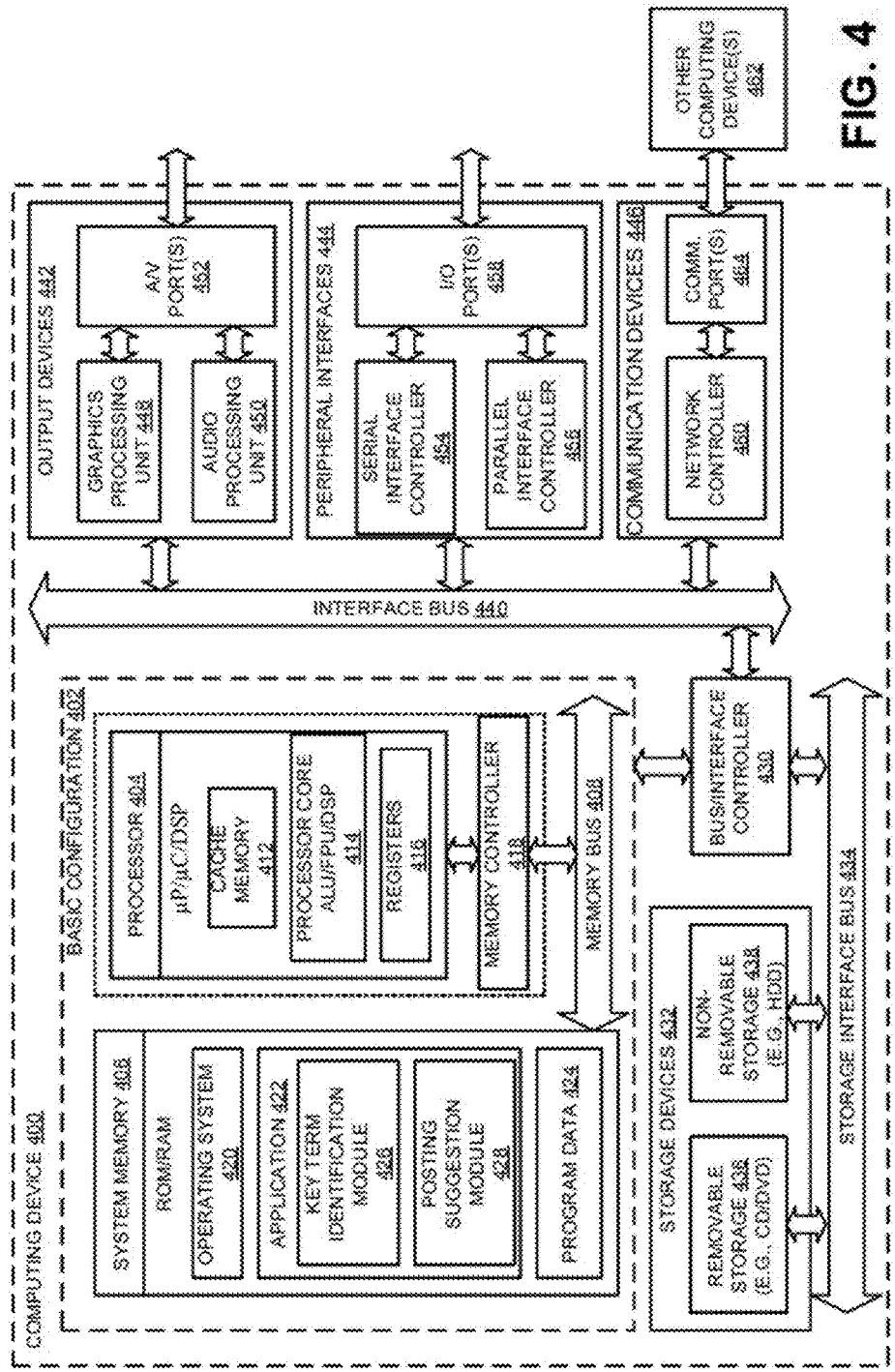
FIG. 4 illustrates a general purpose computing device, which may be used to control a system for suggesting content to be posted in conjunction with a posting for a communication network.

FIG. 4 illustrates a general purpose computing device, which may be used to control a system for suggesting content to be posted in conjunction with a posting for a communication network, arranged in accordance with at least some embodiments described herein. In a basic configuration 402, a computing device 400 typically includes one or more processors 404 and a system memory 406. A memory bus 408 may be used for communicating between a processor 404 and system a memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a level cache memory 412, a processor core 414, and one or more registers 416. An example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include a key term identification module 426 that is arranged to process natural language of viewed content to identify one or more key terms and other properties such as object and facial recognition, tags, and metadata included with the viewed content. The application 422 may also include a posting suggestion module 428 which may be arranged to identify information within a predefined domain associated with the user that may be related to the viewed content and to present the identified information for selection by the user to post with the viewed content. Program data 424 may include key term data, user data, identified information data, and other similar data. The program data 424 may be useful in identifying information related to the viewed content based on a comparison of one or more key terms and other properties such as object and facial recognition, tags, and metadata. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations. Moreover the computing device 400 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
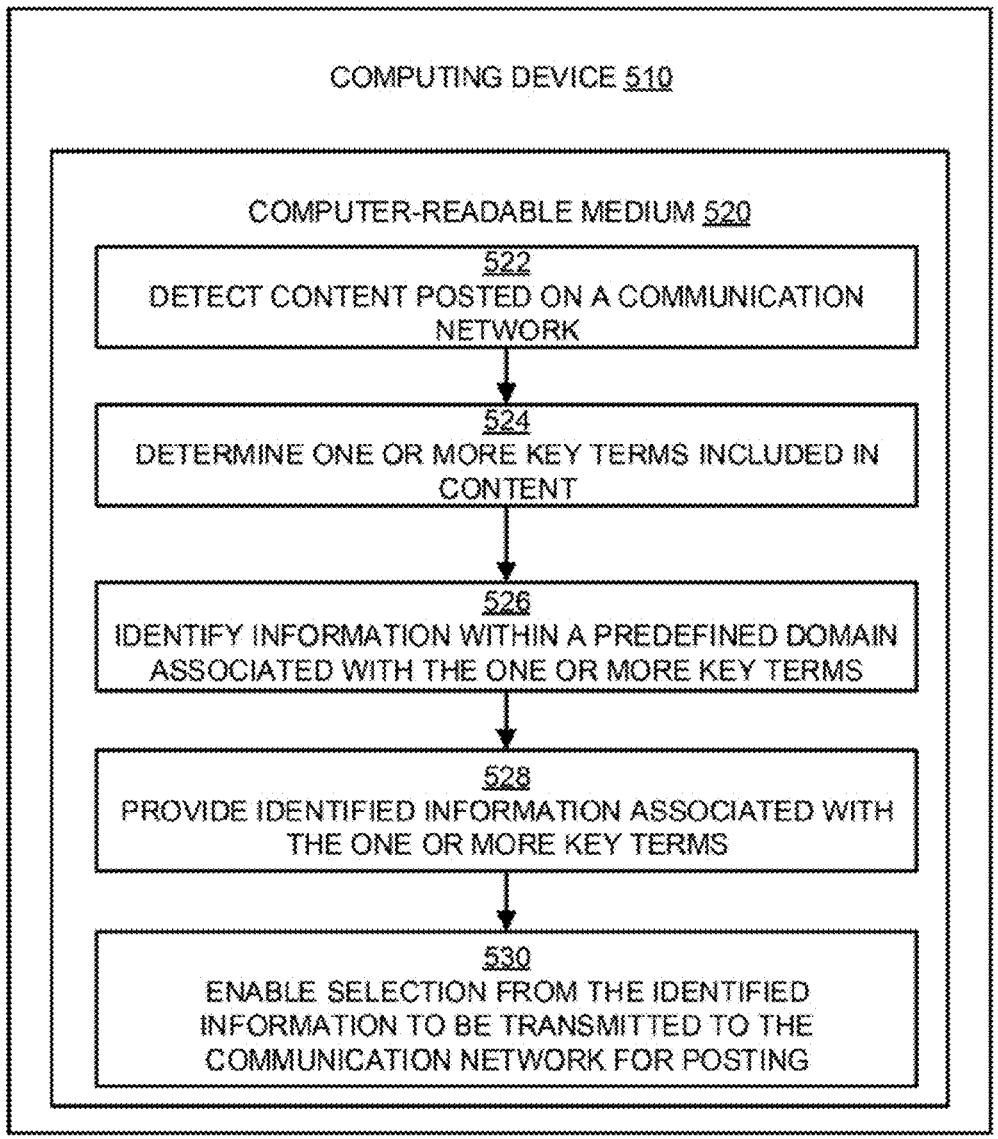
FIG. 5 is a flow diagram illustrating an example method that may be performed by a computing device such as the computing device in FIG. 4.

FIG. 5 is a flow diagram illustrating an example method that may be performed by a computing device such as the computing device 400 in FIG. 4, arranged in accordance with at least some embodiments described herein.

Example methods may include one or more operations, functions or actions as illustrated by one or more of blocks 522, 524, 526, 528, and/or 530. The operations described in blocks 522 through 530 may also be stored as computer-executable instructions in a computer-readable medium such as a computer-readable medium 520 of a computing device 510.

A process for allowing merchants to provide packaging for ready recyclable items may begin with block 522, "DETECT CONTENT POSTED ON A COMMUNICATION NETWORK." At block 522, the computing device may detect content viewed on a communication network by a user. Additionally, when a subscriber of the communication network generates content to be posted on the communication network, the system may initially detect the content to be posted.

Block 522 may be followed by block 524, "DETERMINE ONE OR MORE KEY TERMS INCLUDED IN THE CONTENT." At block 524, the system may identify one or more key terms and other properties such as facial and object recognition properties, tags, and metadata included in the content to be posted.

Block 524 may be followed by block 526, "IDENTIFY INFORMATION WITHIN A PREDEFINED DOMAIN ASSOCIATED WITH THE ONE OR MORE KEY TERMS." At block 526, upon identifying one or more key terms included in the content to be posted, the system may search a predefined domain associated with the user for identifying information and content related to the one or more key terms. The predefined domain associated with the user may include user files such as files stored within one or more computing devices associated with the user and web browser history files.

Block 526 may be followed by block 528, "PROVIDE IDENTIFIED INFORMATION ASSOCIATED WITH THE ONE OR MORE KEY TERMS." At block 528, the system may select the related identified information and may present the selected identified information to the user. The selected identified information may be presented on a content suggestion list for providing the user with a list of options of identified information related to the viewed content.

Block 528 may be followed by block 530, "ENABLE SELECTION FROM THE IDENTIFIED INFORMATION TO BE TRANSMITTED TO THE COMMUNICATION NETWORK FOR POSTING." At block 530, the system may enable the user to select from the content suggestion list presenting related identified information options, and upon detection of a selection by the user, the system may post the selected information along with the viewed content.

In some example embodiments, the content may be automatically posted if it meets one or more predefined criteria. For example an automatic post generation bot may determine the key terms, find relevant content in the predefined domain, and post the found content if user or system defined criteria for posting are satisfied. The criteria may be defined through rules, for example. A user may specify rules like "content from my work files only", "content generated after June 2", "content with 95% match to the key terms", and so on. The user may also define combination of one or more of these rules. Additionally, the communication network or another controlling entity (e.g., an organization in whose enterprise network content is posted) may define the criteria or at least a portion of it.

The blocks included in the above described process are for illustration purposes. Providing content suggestion presenting options for posting identified information related to viewed content on a communication network may be performed by similar processes with fewer or additional blocks. In some examples, the blocks may be performed in a different order. In some other examples, various blocks may be eliminated. In still other examples, various blocks may be divided into additional blocks, or combined together into fewer blocks. Although illustrated as sequentially ordered operations, in some implementations the various operations may be performed in a different order, or in some cases various operations may be performed at substantially the same time.

Figure 6:
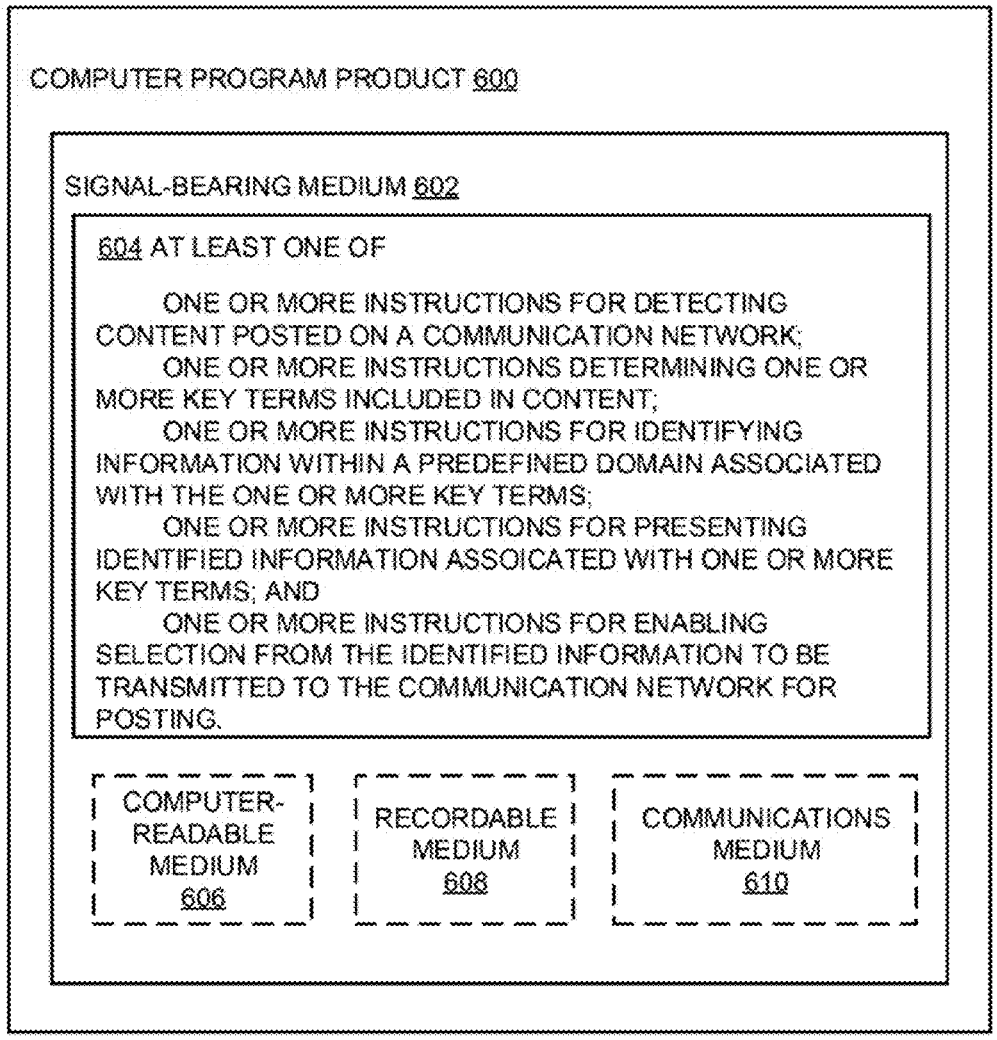
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, a computer program product 600 may include a signal bearing medium 602 that may also include machine readable instructions 604 that, when executed by, for example, a processor, may provide the functionality described above with respect to FIG. 4. Thus, for example, referring to the processor 404, the key term identification module 426 and the posting suggestion module 428 may undertake one or more of the tasks shown in FIG. 6 in response to the instructions 604 conveyed to the processor 404 by the signal bearing medium 602 to perform actions associated with providing content suggestion presenting options for posting identified information related to viewed content on a communication network as described herein. Some of those instructions may include detecting content intended for posting on a communication network, determining one or more key terms included in the content, identifying information within a predefined domain associated with the one or more key terms, providing identified information associated with one or more key terms, and enabling selection from the identified information to be transmitted to the communication network for posting.

In some implementations, the signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by a wireless communications medium 610 (e.g., a wireless communications medium conforming with the IEEE 802.11 standard).

According to some examples, the present disclosure describes a method for suggesting content in conjunction with a posting on a communication network. The method may include detecting a posting intended for a communication network, determining one or more key terms included in the posting, identifying information within a predefined domain associated with the one or more key terms, presenting the identified information associated with the one or more key terms, and enabling a selection from the identified information to be transmitted to the communication network for posting. Identifying information within the predefined domain associated with the one or more key terms may include searching for information associated with the one or more key terms on one of: an file system and a web browser history of a posting source.

According to some examples, the method may include searching for information on one or more of: one or more computing devices associated with the posting source, a data storage associated with the posting source, a predefined network associated with multiple posting sources, and a cloud network associated with the posting source. The method may further include searching for one or more of: textual data files, graphics, images, videos, emails, web links, posted content by the posting source, and posted content by other posting sources.

According to some examples, the method may include comparing the one or more key terms included in the content to be posted with one or more of: textual data, metadata, tags, facial recognition, and object recognition results associated with the information identified during the search, and if the one or more key terms are related to one or more of the textual data, metadata, tags, facial recognition, and object recognition results associated with the information identified during the search, selecting the information for presenting the identified information.

According to some examples, the method may include detecting the posting intended for one or more of a social network, a professional network, a private collaboration network, an enterprise network, and a blog network. The method may also include identifying the information through one of: a local application or a hosted service. The hosted service for identifying the information may be provided by one of the communication network or a cloud network.

According to other examples, the method may include automatically posting the identified information with the content to be posted on the communication network. The method may also include presenting the identified information associated with the one or more key terms upon one or more of: a mouse over, a right click, a touch, a gesture, and a voice command. The method may further include if the identified information has already been posted to the communication network, presenting a link to the posted identified information, and enabling a selection of the link for posting the selected identified information with the content to be posted on the communication network. The method may further include including the determined one or more key terms as metadata with content to be posted for enabling information associated with the one or more key terms to be identified by other subscribers of the communication network.

According to some examples, the present disclosure also describes a server for suggesting content for posting on a communication network. The server may include a memory configured to store instructions, a communication module configured to facilitate communications with one or more communication networks and one or more computing devices, and a processor configured to execute a posting application in conjunction with the instructions stored in the memory. The posting application may be configured to detect a posting intended for a communication network, determine one or more key terms included in the posting, identify information within a predefined domain associated with the one or more key terms, present the identified information associated with the one or more key terms, and enable a selection from the identified information to be transmitted to the communication network for posting.

According to some examples, the posting application may be further configured to search for information associated with the one or more key terms on one of: a file system and a web browser history of a posting source. The posting application may be further configured to search for information on one or more of: one or more computing devices associated with the posting source, a data storage associated with the posting source, a predefined network associated with multiple posting sources, and a cloud network associated with the posting source. The information may include one or more of: textual data files, graphics, images, videos, emails, web links, posted content by the posting source, and posted content by other posting sources.

According to some examples, the posting application may be further configured to compare the one or more key terms included in the content to be posted with one or more of: textual data, metadata, tags, facial recognition, and object recognition results associated with information identified during the search, and if the one or more key terms are related to one or more of the textual data, metadata, tags, facial recognition, and object recognition results associated with information identified during the search, select the information for presenting the identified information. The communication network may be one of a social network, a professional network, a private collaboration network, an enterprise network, and a blog network.

According to some examples, the posting application may be further configured to identify the information through one of: a local application or a hosted service. The hosted service for identifying the information may be provided by one of the communication network or a cloud network. The posting application may be further configured to automatically post the identified information with the content to be posted on the communication network. The posting application may be further configured to present the identified information associated with the one or more key terms upon one or more of: a mouse over, a right click, a touch, a gesture, and a voice command.

According to other examples, the posting application may be further configured to if the identified information has already been posted to the communication network, present a link to the posted identified information, and enable a selection of the link for posting the selected identified information with the content to be posted on the communication network. The posting application may be further configured to include the determined one or more key terms as metadata with content to be posted for enabling information associated with the one or more key terms to be identified by subsequent subscribers of the communication network. The server for suggesting content for posting on the communication network may be provided at the communication network. The server for suggesting content for posting on the communication network may be provided by a third party entity.

According to further examples, the present disclosure also describes a computer readable memory device with instructions stored thereon for suggesting content for posting on a communication network. The instructions may include detecting a posting intended for a communication network, determining one or more key terms included in the posting, identifying information within a predefined domain associated with the one or more key terms, presenting the identified information associated with the one or more key terms, and enabling a selection from the identified information to be transmitted to the communication network for posting.

According to other examples, identifying information within a predefined domain associated with the one or more key terms may include searching for information associated with the one or more key terms on one of: a file system and a web browser history of a posting source. The instructions may further include searching for information on one or more of: one or more computing devices associated with the posting source, a data storage associated with the posting source, a predefined network associated with multiple posting sources, and a cloud network associated with the posting source.

According to other examples, searching for the information may include searching for one or more of: textual data files, graphics, images, videos, emails, web links, posted content by the posting source, and posted content by other posting sources. Identifying information within a predefined domain associated with the one or more key terms may include comparing the one or more key terms included in the content to be posted with one or more of: textual data, metadata, tags, facial recognition, and object recognition results associated with the information identified during the search, and if the one or more key terms are related to one or more of the textual data, metadata, tags, facial recognition, and object recognition results associated with the information identified during the search, selecting the information for presenting the identified information.

According to other examples, wherein detecting the posting intended for the communication network may include detecting the posting intended for one or more of a social network, a professional network, a private collaboration network, an enterprise network, and a blog network. The instructions may also include identifying the information through one of: a local application or a hosted service. The hosted service for identifying the information may be provided by the communication network. The instructions may also include automatically posting the identified information with the content to be posted on the communication network.

According to other examples, the instructions may further include presenting the identified information associated with the one or more key terms upon one or more of: a mouse over, a right click, a touch, a gesture, and a voice command. The instructions may also include if the identified information has already been posted to the communication network, presenting a link to the posted identified information on the content suggestion list, and enabling a selection of the link for posting the selected identified information with the content to be posted on the communication network. The instructions may also provide including the determined one or more key terms as metadata with content to be posted for enabling information associated with the one or more key terms to be identified by other subscribers of the communication network.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented using any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to post content on a communication network, the method comprising:
    detecting first content that is posted on the communication network by a first user;
    identifying one or more of a first key term and a first property included in the first content, wherein the one or more of the first key term and the first property include one or more of faces, objects, tags, and metadata associated with the first content;

detecting an attempt by a second user to post second content related to the first content;

in response to the detection of the attempt by the second user to post the second content related to the first content, searching for information within a particular domain associated with the one or more of the first key term and the first property;

in response to identification of the information during the search within the particular domain, determining the second content to post on the communication network, wherein the second content includes one or more of a second key term and a second property, wherein the one or more of the second key term and the second property include one or more of faces, objects, tags, and metadata associated with the second content, which are recognized from results associated with the information that is identified during the search within the particular domain, and wherein the second content is identified from the results associated with the information based on a comparison of one or more of the first key term to the second key term and the first property to the second property;

in response to a determination that the second content meets one or more criteria, determining whether the second content was previously posted on the communication network;

in response to a determination that the second content was not previously posted on the communication network, posting the second content automatically for the second user on the communication network; and in response to a determination that the second content is previously posted on the communication network, posting a link to the previously posted second content automatically for the second user on the communication network.

2. The method of claim 1, wherein identifying the one or more of the first key term and the first property includes:

performing facial recognition on the first content to identify the faces of the one or more of the first key term and the first property included in the first content.

3. The method of claim 1, wherein identifying the one or more of the first key term and the first property includes:

performing object recognition on the first content to identify the objects of the one or more of the first key term and the first property included in the first content.

4. The method of claim 1, wherein identifying the one or more of the first key term and the first property includes:

performing natural language processing on the first content to identify the tags of the one or more of the first key term and the first property included in the first content.

5. The method of claim 1, wherein searching for the information within the particular domain includes searching a domain of a posting source associated with the second user to determine the second content to post on the communication network.

6. The method of claim 1, wherein searching for the information within the particular domain includes searching a data store associated with the second user to determine the second content to post on the communication network.

7. The method of claim 1, wherein searching for the information within the particular domain includes searching a web browsing history associated with a posting source of the second user to determine the second content to post on the communication network.

8. The method of claim 1, wherein:

searching for the information within the particular domain includes searching a file system associated with a posting source of the second user to determine the second content to post on the communication network, and the method further comprises identifying the information that is associated with the second content from one or more of: a computing device associated with the posting source, a data storage associated with the posting source, a particular network associated with multiple posting sources, and a cloud network associated with the posting source.

9. The method of claim 8, wherein searching for the information within the particular domain includes searching for one or more of a textual data file, a graphic, an image, a video, an email, a web link, posted content by the posting source, and posted content by other posting sources.

10. The method of claim 1, wherein searching for the information within the particular domain includes searching one or more emails associated with a posting source of the second user to determine the second content to post on the communication network.

11. A server to post content on a communication network, the server comprising:

a memory configured to store instructions;

a communication device configured to facilitate communications with the communication network and one or more computing devices; and a processor coupled to the memory and to the communication device, and configured to execute a posting application in conjunction with the instructions stored in the memory, wherein the posting application is configured to:

detect first content that is posted on the communication network by a first user;

perform one or more of facial recognition, objection recognition, and natural language processing on the first content to identify one or more of a first key term and a first property of the first content, wherein the one or more of the first key term and the first property include one or more of faces, objects, tags, and metadata associated with the first content;

detect an attempt by a second user to post second content related to the first content;

in response to the detection of the attempt by the second user to post the second content related to the first content, search for information within a particular domain associated with the one or more of the first key term and the first property;

in response to identification of the information during the search within the particular domain, determine the second content to post on the communication network, wherein the second content includes one or more of a second key term and a second property, wherein the one or more of the second key term and the second property include faces, objects, tags, and metadata associated with the second content, which are recognized from results associated with the information that is identified during the search within the particular domain, and wherein the second content is identified from the results associated with the information based on a comparison of one or more of the first key term to the second key term and the first property to the second property;

in response to a determination that the second content meets one or more criteria, determine whether the second content was previously posted on the communication network;

in response to a determination that the second content was not previously posted on the communication network, post the second content automatically for the second user on the communication network; and in response to a determination that the second content was previously posted on the communication network, post a link to the previously posted second content automatically for the second user on the communication network.

12. The server of claim 11, wherein the one or more criteria include rules defined by one or more of the first user and the second user.

13. The server of claim 11, wherein the first content includes one or more of textual content, a status update, image content, video content, graphical content, a comment, a blog post, a link, and an annotation.

14. The server of claim 11, wherein the communication network includes one or more of a social network, a professional network, a private collaboration network, an enterprise network, and a blog network.

15. The server of claim 11, wherein the server is provided at the communication network or is provided by a third party entity.

16. A computer-readable memory device with instructions stored thereon to post content on a communication network, wherein the instructions, in response to execution by a processor, cause the processor to perform or control performance of operations to:

detect first content that is posted on the communication network by a first user, perform one or more of facial recognition, objection recognition, and natural language processing on the first content to identify one or more of a first key term and a first property of the first content, wherein the one or more of the first key term and the first property include one or more of faces, objects, tags, and metadata associated with the first content;

detect an attempt by a second user to post second content related to the first content;

in response to the detection of the attempt by the second user to post second content related to the first content, search for information within a particular domain associated with the one or more of the first key term and the first property;

in response to identification of the information during the search within the particular domain, determine the second content to post on the communication network, wherein the second content includes one or more of a second key term and a second property, wherein the one or more of the second key term and the second property include faces, objects, tags, and metadata associated with the second content, which are recognized from results associated with the information that is identified during the search within the particular domain, and wherein the second content is identified from the results associated with the information based on a comparison of one or more of the first key term to the second key term and the first property to the second property;

in response to a determination that the second content meets one or more criteria, determine whether the second content was previously posted on the communication network;

in response to a determination that the second content was not previously posted on the communication network, post the second content automatically for the second user on the communication network; and in response to a determination that the second content was previously posted on the communication network, post a link to the previously posted second content automatically for the second user on the communication network.

17. The computer-readable memory device of claim 16, wherein the operations to search for the information within the particular domain comprises at least one operation to search for one or more of a domain of a posting source associated with the second user, a data store associated with the second user, and a web browsing history associated with the posting source of the second user to determine the second content to post on the communication network.

18. The computer-readable memory device of claim 16, wherein:

the operations to search for the information within the particular domain comprises at least one operation to search a file system associated with a posting source of the second user to determine the second content to post on the communication network, and the instructions, in response to execution by the processor, cause the processor to perform or control performance of at least one operation to:

identify the information associated with the second content from one or more of: a computing device associated with the posting source, a data storage associated with the posting source, a particular network associated with multiple posting sources, and a cloud network associated with the posting source; and search for one or more of: a textual data file, a graphic, an image, a video, an email, a web link, posted content by the posting source, and posted content by other posting sources.

* * * * *